E. D. ANDREWS
Barrel-Truck

No. 211,080          Patented Jan. 7, 1879.

Witnesses:
P. H. Dieterich
Frank H. Duffy

Inventor:
Elvin D. Andrews
Per Manahan & Ward
Attorneys

UNITED STATES PATENT OFFICE.

ELVIN D. ANDREWS, OF STERLING, ASSIGNOR OF ONE-HALF HIS RIGHT TO JOHN B. RALPH, OF ROCK FALLS, ILLINOIS.

IMPROVEMENT IN BARREL-TRUCKS.

Specification forming part of Letters Patent No. 211,080, dated January 7, 1879; application filed October 22, 1878.

*To all whom it may concern:*

Be it known that I, ELVIN D. ANDREWS, of Sterling, in the county of Whiteside and State of Illinois, have invented certain new and useful Improvements in Barrel-Carts; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to that class of barrel-carts in which the barrel is held in a perpendicular position in a frame, and suspended therein between the wheels of the cart.

Figure 1:
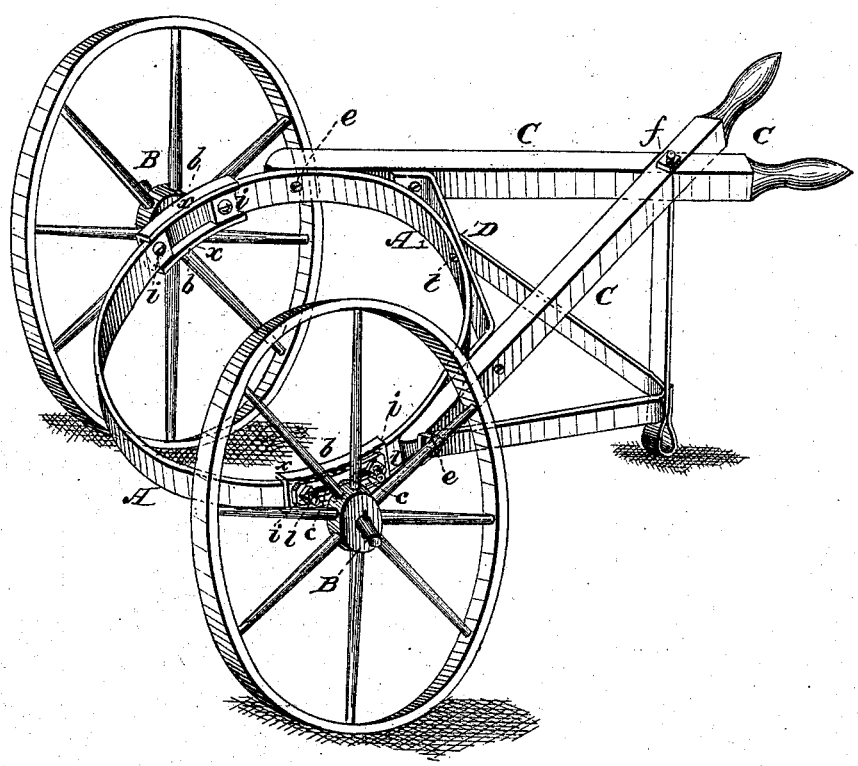
Figure 2:
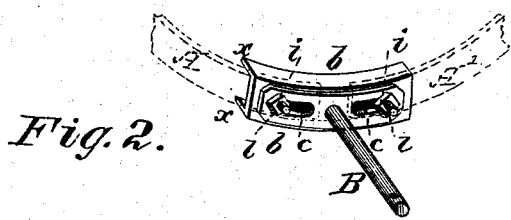

In the drawings, Figure 1 is a perspective view of my invention. Fig. 2 is a view of the spindle and its arm detached.

A A' are two semicircular parts, which, in connection with the arms of the spindles, form a complete circle, in which the barrel or tub is placed.

B is a spindle, having an arm, $b$, with the slots $c$ therein, which arm is provided on its inner curved surface with flanges $x$.

C C are the handles by which the cart is drawn, and D is a lateral brace bolted at each of its ends to the inside of said handles, and to the center of the semicircle A'. The handles C C are bolted to the semicircle A' at $e$ with one or more bolts, and are firmly braced laterally by the brace D, which is bolted to the semicircle A' at $t$.

The semicircles A A' are adjusted so as to form any circle of the desired size by means of the slots $c$, screw-bolts $l$, and nuts $i$. When it is desirable to contract or enlarge the circle the nuts $i$ are loosened by means of a wrench and the semicircles moved closer together or farther apart, being governed in such movement by the flanges $x$.

Another method of adjusting the circle to the size of the barrel or tub desired to be used is by providing the ends of the semicircles with a series of holes corresponding with a second series of holes in the arms $b$ of the spindle B, and fastening the said semicircles and spindles rigidly together by means of two or more thread-bolts and nuts in each end of each semicircle.

By attaching the handles to the semicircle A' at $e$, and by means of the lateral brace D, bolted as described, great strength and durability are given to my invention, and the crossing of the handles at $f$, as shown, renders the tipping of the cart backward easy with one hand, and without strain to any of its parts.

My invention is used principally for conveying, in a cask, barrel, or tub, slops, feed, or water from one place to another, for the purpose of feeding or watering stock, and by attaching a hose to the bottom of the cask or barrel my invention may be used to carry water and sprinkle the garden or lawn.

The advantages of my invention consist in its lightness, cheapness, and durability, and especially in its susceptibility of adjustment to suit the size of the barrel to be used.

What I claim as my invention, and desire to secure by Letters Patent, is—

1. The spindle B, having the arms $b$, slots $c$, and flanges $x$, substantially as shown and described.

2. The handles C, brace D, semicircles A and A', and spindles B, substantially as shown, and for the purpose set forth.

3. In a barrel-cart, the combination of the semicircles A A', spindles B, having the arms $b$, slots $c$, and flanges $x$, and the handles C C, brace D, bolts $l$, and nuts $i$, all arranged substantially as shown, and for the purpose specified.

In testimony that I claim the foregoing as my own I affix my signature in presence of two witnesses.

ELVIN D. ANDREWS.

Witnesses:
SETH LOYD,
W. SCOTT WARD.